Oct. 13, 1925.  
T. E. NICHOLSON  
1,556,872  
SAFETY DEVICE FOR CORN SHREDDERS  
Filed Dec. 22, 1923  2 Sheets-Sheet 2

Inventor  
Thomas E. Nicholson  
by  
H. S. Johnson  
Att'y.

Patented Oct. 13, 1925.

1,556,872

UNITED STATES PATENT OFFICE.

THOMAS E. NICHOLSON, OF ST. PAUL, MINNESOTA.

SAFETY DEVICE FOR CORN SHREDDERS.

Application filed December 22, 1923. Serial No. 682,216.

*To all whom it may concern:*

Be it known that I, THOMAS E. NICHOLSON, a citizen of the United States, residing at St. Paul, in the county of Ramsey and State of Minnesota, have invented certain new and useful Improvements in Safety Devices for Corn Shredders, of which the following is a specification.

The present invention relates to clutch mechanism and more particularly to an improved safety clutch for use on farm machinery.

Corn machinery which uses rotary cutters or shredders to cut or shred corn for fodder is sometimes the cause of serious accidents which endanger the life and limb of the operators thereof. Most of the accidents occur when too much material is fed into the machine, thereby jamming the rotary cutter or shredder to prevent its rotation. When this occurs, the operator, either with his hands or a tool, must remove the obstruction and sometimes does this without releasing the clutch. When a portion of the obstructing material is removed, the friction of the driving mechanism overcomes the resistance of the obstruction and suddenly starts the rotary cutter or shredder with the possibility of catching a portion of the operator's body therein.

An object of the present invention is to release the driving mechanism of an agricultural implement when the operator thereof moves from the operating position.

A further object is to make a self-actuated safety drive mechanism release for agricultural machinery.

A still further object is to lock the driving mechanism of an agricultural implement in a released position upon the actuation of a release mechanism.

To attain these objects there is provided, in accordance with one embodiment of the invention, spring releasing foot actuated clutch mechanism in combination with a locking mechanism so arranged as to lock the clutch mechanism when the operator steps from the operating position on the machine and to require manual disengagement of the locking mechanism before the clutch mechanism can be re-engaged.

These and other features of the invention, not specifically mentioned, will be made clear in the following description and the accompanying drawings, wherein.

Figure 1:
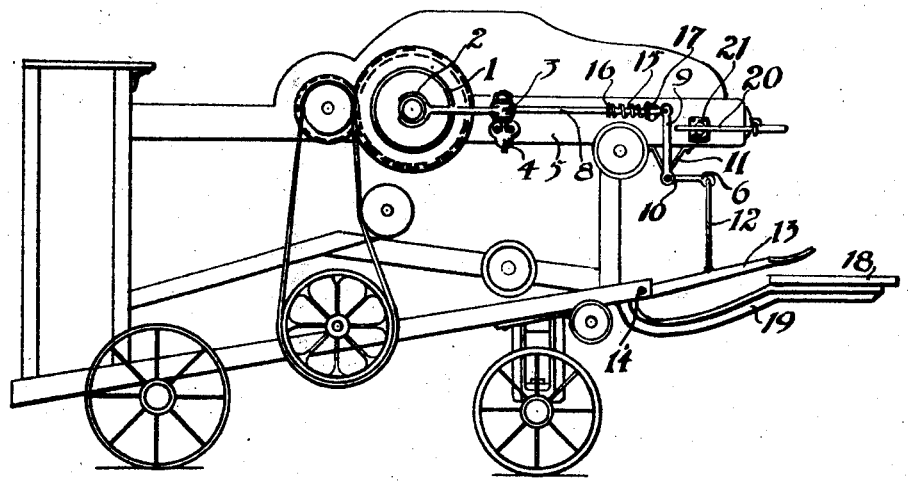
Figure 1, is a view in side elevation of a corn shredder equipped with the above mechanism.
Figure 2:
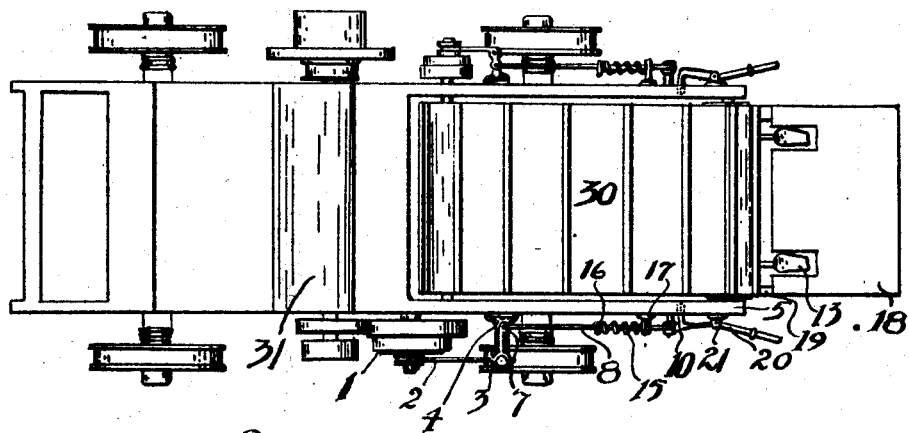
Figure 2, is a view in top elevation of the same.
Figure 3:
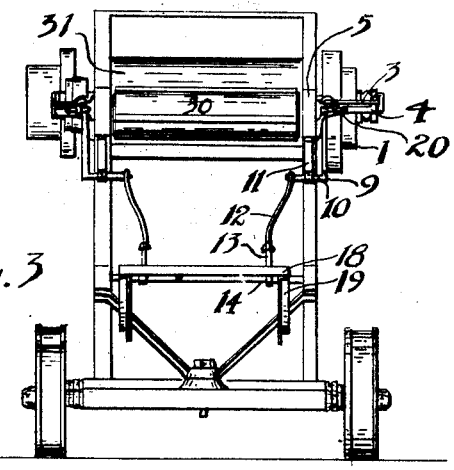
Figure 3, is a rear end view of the same.

A machine is shown in Figures 1 to 3, inclusive, provided on one side with a clutch mechanism and its associated parts for operating the rotary cutter or shredder of corn machinery, and a clutch mechanism and associated parts for operating the feeding mechanism is shown on the other side. Inasmuch as it is the rotary cutter or shredder which it is most necessary to control, and since the clutch mechanism and associated parts for the feeding mechanism are virtually a duplication of those used for operating the clutch of the rotary cutter, a detailed description will be given of the clutch mechanism and associated parts for operating the rotary cutter or shredder only. From this, the structure and operation of the other clutch and its associated parts will be apparent.

To refer to the drawings in detail, a clutch 1 of an ordinary type is actuated by the bifurcated arm 2 of a bell crank lever 3, which is pivotally connected to a bracket 4, fastened to the frame 5 of a corn machine in any suitable manner.

Pivotally connected to the outer end of the other arm of the bell crank lever at 7, is a rod 8, which extends rearward and is pivotally connected at its rearmost end to the arm 9 of a second bell crank lever 10, which is pivotally mounted in a bracket 11, fastened to the under side of the frame of the corn machine. The other arm 6 of this bell crank lever is pivotally connected at its outer extremity by means of a link 12 to a foot operated lever 13, which is pivotally connected at 14 to the frame of the corn shredder.

The rod 8 is subjected to a continuous resilient forward impulse by means of a spring 15 surrounding this member. The spring 15 is held in compression between an annular member 16 integral with the rod 8 and a bracket 17 integral with the frame of the machine.

A platform 18 upon which the operator stands to run the machine, may be supported by means of angle iron brackets 19, securely fastened to the frame of the machine in any suitable manner.

Figures 4, 5:
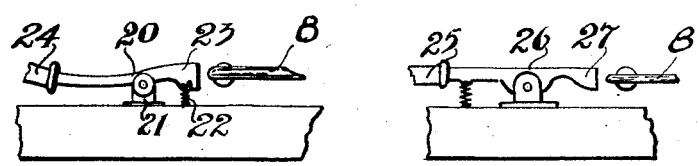
Figure 4, shows a spring actuated manually releasing locking lever.
Figure 5, shows a modified form thereof.
Figure 6:
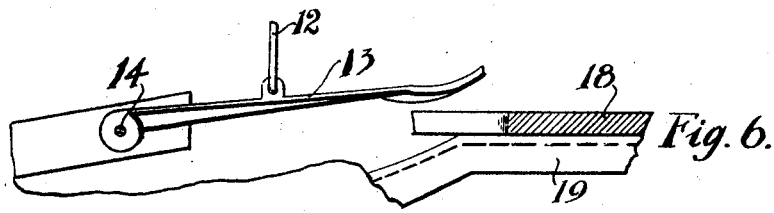
Figure 6, shows the foot pedal of a clutch actuating mechanism.

A locking mechanism to lock the clutch in a released position when spring 15 impels rod 8 forward, is shown in Figure 4. A lever 20 is pivotally mounted upon a bracket 21 integral with the frame, and a spring 22, held in compression between lever 20 and the frame, tends to move the arm 23 of lever 20 away from the frame to block the rearward path of member 8 and its associated parts. This form of locking mechanism is released by moving the arm 24 of lever 20 outwardly away from the machine, thereby depressing arm 23 to allow the rod 8 and its associated parts to move rearwardly to engage the clutch. In the modified form of locking lever shown in Figure 5, the parts associated with rod 8 are released for rearward movement by manually moving the arm 25 of lever 26 toward the machine, thereby removing arm 27 from the rearward path of rod 8 and its associated parts and permitting engagement of the clutch.

Figure 7:
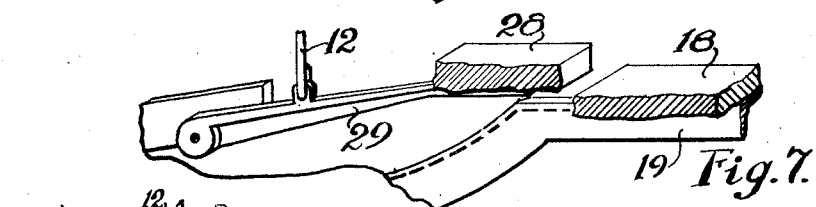
Figure 7, is a view in isometric projection of a modified form thereof.
Figure 8:
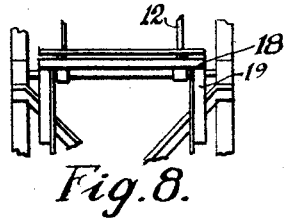
Figure 8, is a fragmentary end view of a machine equipped with a foot pedal similar to that shown in Figure 7.

In the modified form of foot actuated clutch releasing mechanism shown in Figures 7 and 8, there is provided a foot member 28, extending the full width of the operator's platform and connected to foot lever 29 as by means of screws, not shown. Where such a foot actuated mechanism is provided, the clutch for the rotary cutter or shredder is actuated and released thereby and the feeding mechanism may be independently actuated in any suitable manner. This foot member 28 may be made wide enough to support an operator by itself, and in such case no other platform would be required.

It is apparent that in order to start the machine the operator must first release the locking mechanism so as to allow rod 8 and its associated parts to move rearward and then, by placing his weight upon lever 13, move the rod 8 and its associated parts rearward by means of bell crank lever 10. This causes a movement of the bifurcated arm of bell crank lever 3 toward the machine, thereby engaging the clutch to start the mechanism.

Most agricultural machines of this character have a feed belt 30, which is long enough to prevent the operator, while standing on the platform, from reaching into the cutting or shredding chamber 31. Therefore, when it is required to remove an obstruction, the operator must leave the platform and go around to the side of the machine.

Where the clutch is operated in an ordinary manner, the operator frequently forgets to disengage it, merely noting that the cutter or shredder has stopped rotating. With an improved mechanism such as herein illustrated and described, as soon as the operator leaves the platform, the clutch is released by the action of spring 15. The locking levers hold the parts in released position even though a second person were to step on foot lever 13 while the operator was working in proximity to the cutter or shredder, and it would be possible to start the machine only by manually releasing the locking lever 20 and placing a weight upon foot lever 13 sufficient to overcome the resistance of spring 15.

What I claim is:

In a corn shredding mechanism, a frame, a rotary shredder mounted therein, a clutch operatively associated with the shredder, a bell crank lever pivotally connected to the frame having one arm thereof pivotally connected to the clutch, a link and lever means operatively connecting the other arm of the bell crank lever to the link and lever, a hand operated lever pivotally connected to the frame of the corn shredder, said hand operated lever having a normal position to resist operation of the bell crank lever, and a depressed position to permit operation of the bell crank lever, resilient means intermediate the hand operated lever and the frame to urge said lever to a normal position when depressed, said hand operated lever being positioned adjacent the means connecting an arm of the bell crank lever to the link and lever to be held in a depressed position upon actuation of the link and lever to operate the clutch.

In testimony whereof I affix my signature.

THOMAS E. NICHOLSON.